United States Patent
Maani (10) Patent No.: US 8,792,745 B2
(45) Date of Patent: Jul. 29, 2014

(54) ENCODER OPTIMIZATION OF ADAPTIVE LOOP FILTERS IN HEVC

(75) Inventor: Ehsan Maani, San Jose, CA (US)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 13/312,941

(22) Filed: Dec. 6, 2011

(65) Prior Publication Data

US 2013/0142419 A1    Jun. 6, 2013

(51) Int. Cl.
*G06K 9/40* (2006.01)

(52) U.S. Cl.
USPC .......................................... 382/261; 382/275

(58) Field of Classification Search
USPC ................... 382/261, 275
See application file for complete search history.

(56) References Cited

U.S. PATENT DOCUMENTS

| | | | | |
|---|---|---|---|---|
| 6,157,403 A * | 12/2000 | Nagata | ........................... | 348/171 |
| 8,180,171 B2 * | 5/2012 | Lin | ............................... | 382/264 |
| 2007/0019873 A1 * | 1/2007 | Tzannes et al. | ............... | 382/239 |
| 2009/0232408 A1 * | 9/2009 | Meany | ........................... | 382/246 |
| 2011/0026611 A1 * | 2/2011 | Kenji | ........................ | 375/240.29 |
| 2012/0082244 A1 * | 4/2012 | Chen et al. | ................ | 375/240.29 |
| 2012/0093217 A1 * | 4/2012 | Jeon et al. | ................ | 375/240.02 |
| 2012/0183050 A1 * | 7/2012 | Liu et al. | .................. | 375/240.03 |
| 2012/0183081 A1 * | 7/2012 | Liu et al. | .................. | 375/240.29 |
| 2012/0224776 A1 * | 9/2012 | Tzannes et al. | ............... | 382/235 |
| 2013/0022127 A1 * | 1/2013 | Park et al. | ................ | 375/240.16 |
| 2013/0107944 A1 * | 5/2013 | Watanabe et al. | ........ | 375/240.03 |
| 2013/0107959 A1 * | 5/2013 | Park et al. | ................ | 375/240.15 |
| 2013/0142419 A1 * | 6/2013 | Maani | ........................... | 382/159 |
| 2013/0294705 A1 * | 11/2013 | Kondo | ......................... | 382/238 |
| 2013/0301945 A1 * | 11/2013 | Tzannes et al. | ............... | 382/235 |

OTHER PUBLICATIONS

Chen et al., "Classified Quadtree-based Adaptive Loop Filter", 2011 IEEE International Conference on Multimedia and Expo, Jul. 2011.*

* cited by examiner

*Primary Examiner* — Aaron W Carter
(74) *Attorney, Agent, or Firm* — Haverstock & Owens LLP (57) ABSTRACT

An optimized adaptive loop filter does not redesign filters inside the optimization loop of signaling depth which saves computations. Additionally, the Sum of Squared Errors (SSE) (distortion) of blocks is computed for the smallest blocks, thus, allowing for the distortion of larger blocks to be computed efficiently by adding block SSEs together which saves computations by removing redundant operations to calculate SSE of a block each time.

23 Claims, 5 Drawing Sheets

ENCODER OPTIMIZATION OF ADAPTIVE LOOP FILTERS IN HEVC

FIELD OF THE INVENTION

The present invention relates to the field of image processing. More specifically, the present invention relates to encoder optimization.

BACKGROUND OF THE INVENTION

Figure 1:
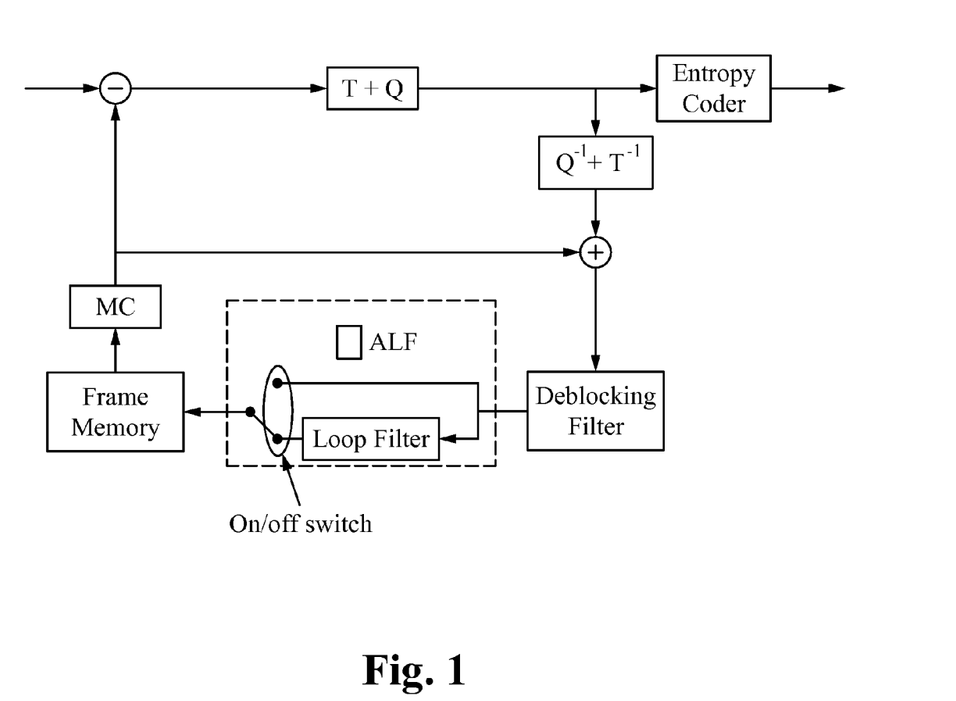
FIG. 1 illustrates a diagram of a portion of an encoder including an adaptive loop filter.

In image processing, an adaptive loop filter (ALF) is performed to remove or reduce quantization noise and artifacts introduced during compression through wiener filtering as shown in FIG. 1. On/off signaling is able to be performed using a block-based adaptive loop filter (BALF) or a quad-tree based adaptive loop filter (QALF).

Figure 2:
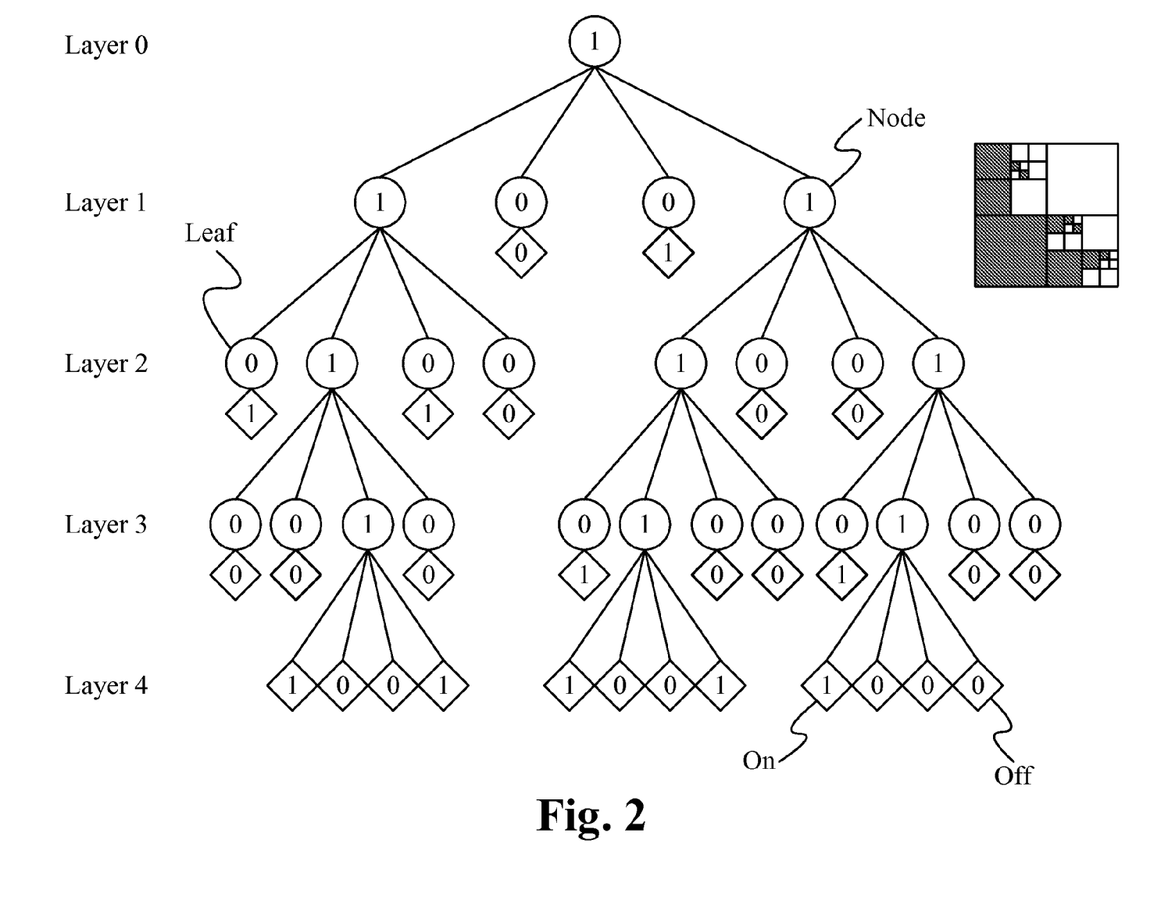
FIG. 2 illustrates a diagram of a bottom up recursive decision tree.

In quad-tree based on/off signaling, for each block (except those in the lowest layer), 1 bit is sent to specify if it is partitioned or not (partitioning signaling). For each non-partitioned block (blocks in the lowest layer are always not partitioned), 1 additional bit is sent to specify if the ALF is applied to the block (on/off switch signaling). Given the Wiener filter, the quad-tree structure is optimized using bottom up recursive decision as shown in FIG. 2.

A Wiener filter is trained online based on the statistics of the pixels that have the ALF on. Training is done by the encoder. In some implementations, each frame has a Wiener filter, of which the filter coefficients are sent to the decoder. Training of Wiener filters requires knowledge of the on/off information of the pixels. However, the on-off decision also requires knowledge of the Wiener filter.

The iteration decision includes training an initial Wiener filter (e.g. based on all pixels), deciding which position to place an on/off switch based on the current Wiener filter, updating the Wiener filter based on all "on" pixels, and performing deciding and updating multiple times (e.g. until conversion).

There are many drawbacks of ALF. In the encoder, there is high computation complexity since there are multiple passes of optimization in filter training and on/off switching. The encoder requires additional delay of one frame (without ALF, the delay is in the order of lines). The encoder stores/retrieves the cross- and auto-correlation matrices for each leaf node multiple times meaning significant memory accesses. The bitstream includes overhead bits signaling the filter coefficients. In the decoder, the Wiener filter coefficients are variable, and multiplication between two variables is expensive compared to multiplying a variable by a fixed number which is able to be replaced with several bit-shifts and additions. Additionally, the hardware implementation of these ALF techniques is very costly, particularly for real-time encoding, because training of Wiener filters has to be done after the entire frame is encoded, and the results of ALF are needed for motion estimation of the next frame. Therefore, the entire pipeline is prolonged, which requires a higher clock rate and more power consumption to meet the real-time constraint.

SUMMARY OF THE INVENTION

An optimized adaptive loop filter does not redesign filters inside the optimization loop of signaling depth which saves computations. Additionally, the Sum of Squared Errors (SSE) (distortion) of blocks is computed for the smallest blocks, thus, allowing for the distortion of larger blocks to be computed efficiently by adding block SSEs together which saves computations by removing redundant operations to calculate SSE of a block each time.

In one aspect, a method of implementing an optimized adaptive loop filter in a device comprises determining distortion with and without filtering for each block of an image and determining if filtering of a current block reduces distortion in the block, if the filtering reduces the distortion, adding the filtered distortion to frame distortion, if the filtering does not reduce the distortion, excluding the current block from a training set and adding non-filtered distortion to the frame distortion, for each block at a current depth, combining distortions to find the distortion, determining total frame distortion and rate due to on/off switching and saving a new training data set and redesigning filters based on the new training data set. The method further comprises determining an initial filter from an entire frame. The distortion is saved in an array. The new training set excludes one or more blocks. The steps occur while a number of redesigning filters at the current depth is less than 2. The method further comprises saving a current rate distortion. The steps occur while the depth is less than or equal to 3, starting with depth 0 and increasing with each iteration. The method is implemented in hardware logic gates. The method is stored in a memory and processed by a processor. The method is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, a method of implementing an optimized adaptive loop filter in a device comprises determining distortion with and without filtering for each block of an image and while a number of redesigning filters at a current depth is less than 2: determining if filtering of a current block reduces distortion in the block, while at a depth less than or equal to 3, starting with depth 0 and increasing with each iteration: if the filtering reduces the distortion, adding the filtered distortion to frame distortion, if the filtering does not reduce the distortion, excluding the current block from a training set and adding non-filtered distortion to the frame distortion, for each block at the current depth, combining distortions to find the distortion, determining total frame distortion and rate due to on/off switching and saving current rate distortion as a new training data set and redesigning filters based on the new training data set. The method further comprises determining an initial filter from an entire frame. The distortion is saved in an array. The new training set excludes one or more blocks. If the filtering reduces the distortion, a 1 is sent in the bitstream, and if the filtering does not reduce the distortion, a 0 is sent in the bitstream. The method is implemented in hardware logic gates. The method is stored in a memory and processed by a processor. The method is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an apparatus comprises a memory for storing an application, the application for determining distortion with and without filtering for each block of an image and while a number of redesigning filters at a current depth is less than 2: determining if filtering of a current block reduces distortion in the block, while at a depth less than or equal to 3, starting with depth 0 and increasing with each iteration: if the filtering reduces the distortion, adding the filtered distortion to frame distortion, if the filtering does not reduce the distortion, excluding the current block from a training set and adding non-filtered distortion to the frame distortion, for each block at the current depth, combining distortions to find the distortion, determining total frame distortion and rate due to on/off switching and saving current rate distortion as a new training data set and redesigning filters based on the new training data set and a processing component coupled to the memory, the processing component configured for processing the application. The apparatus further comprises determining an initial filter from an entire frame. The distortion is saved in an array. The new training set excludes one or more blocks. If the filtering reduces the distortion, a 1 is sent in the bitstream, and if the filtering does not reduce the distortion, a 0 is sent in the bitstream.

DETAILED DESCRIPTION OF THE PREFERRED EMBODIMENT

When encoding a video, a picture is divided into several macroblocks (or coding units). In an optimized encoder, filters are not redesigned inside an optimization loop of signaling depth, and Sum of Squared Errors (SSE) (distortion) of blocks are computed for smallest blocks. Both changes reduce the number of computations.

Figure 3:
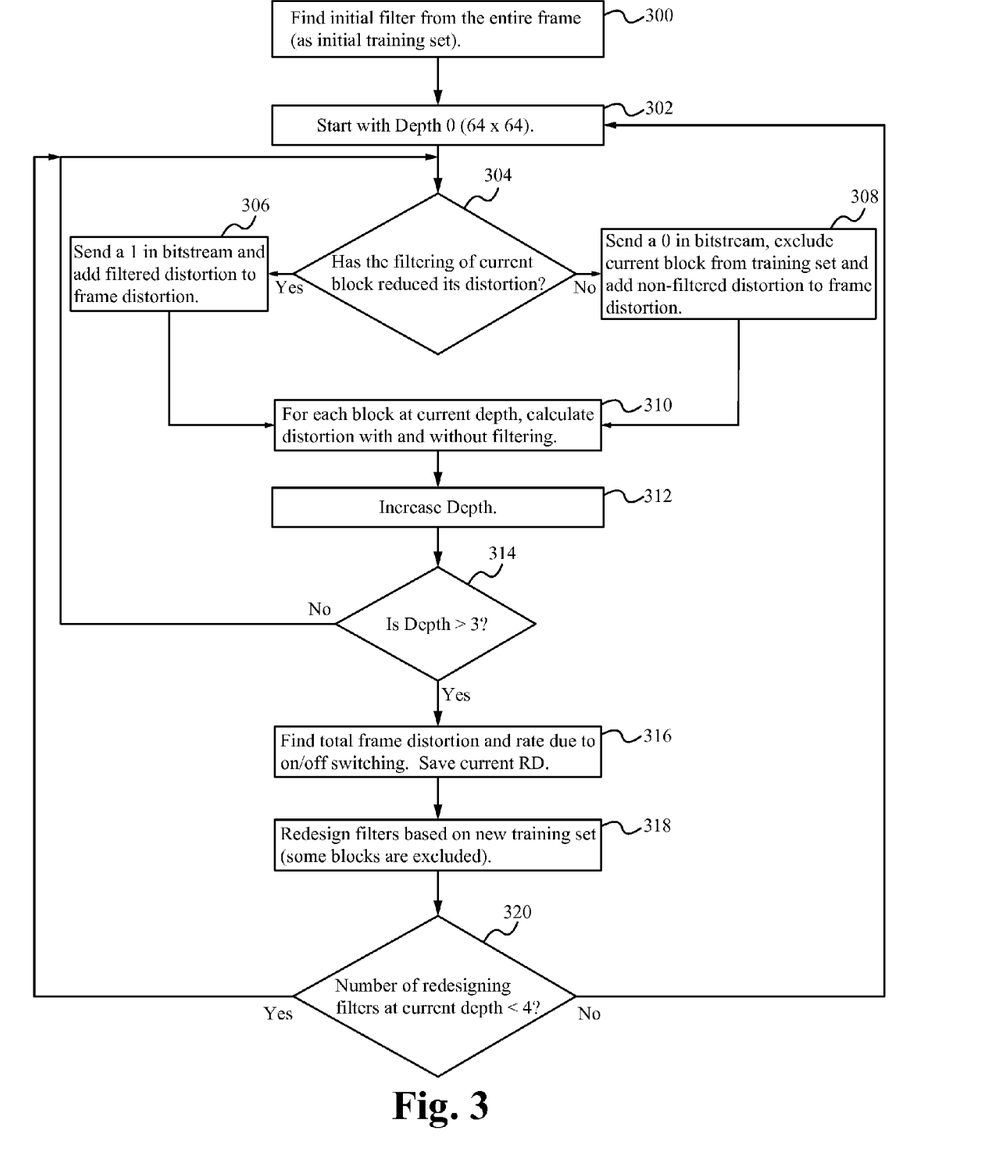
FIG. 3 illustrates a flowchart of a method of encoder optimization according to some embodiments.

FIG. 3 illustrates a flowchart of a method of encoder optimization according to some embodiments. In the step 300, an initial filter is found from an entire frame, as the initial training set. In the step 302, depth 0 (64×64 blocks) is used or selected. In the step 304, it is determined if the filtering of the current block reduces the block's distortion. If the filtering has reduced the distortion, then in the step 306, a "1" is sent in the bitstream, and the filtered distortion is added to the frame distortion. If the filtering has not reduced the distortion, then in the step 308, a "0" is sent in the bitstream, the current block is excluded from the training set and the non-filtered distortion is added to the frame distortion. In the step 310, for each block at current depth, distortion with and without filtering is calculated. In the step 312, the depth is increased (e.g. from depth 1 to depth 2 or depth 2 to depth 3). In the step 314, it is determined if the depth is greater than 3. If the depth is not greater than 3, then the process returns to before the step 304. If the depth is greater than 3, then in the step 316, the total frame distortion and rate due to on/off switching is found, and the current rate distortion is saved. In the step 318, filters are redesigned based on the new training set. In the step 320, if the number of redesigning filters at the current depth is less than 4, then the process returns to before the step 304. In the step 320, if the number of redesigning filters at the current depth is greater than or equal to 4, then the process returns to the step 302. In some embodiments, fewer or more steps are implemented, and in some embodiments, the order of the steps is modified.

Figure 4:
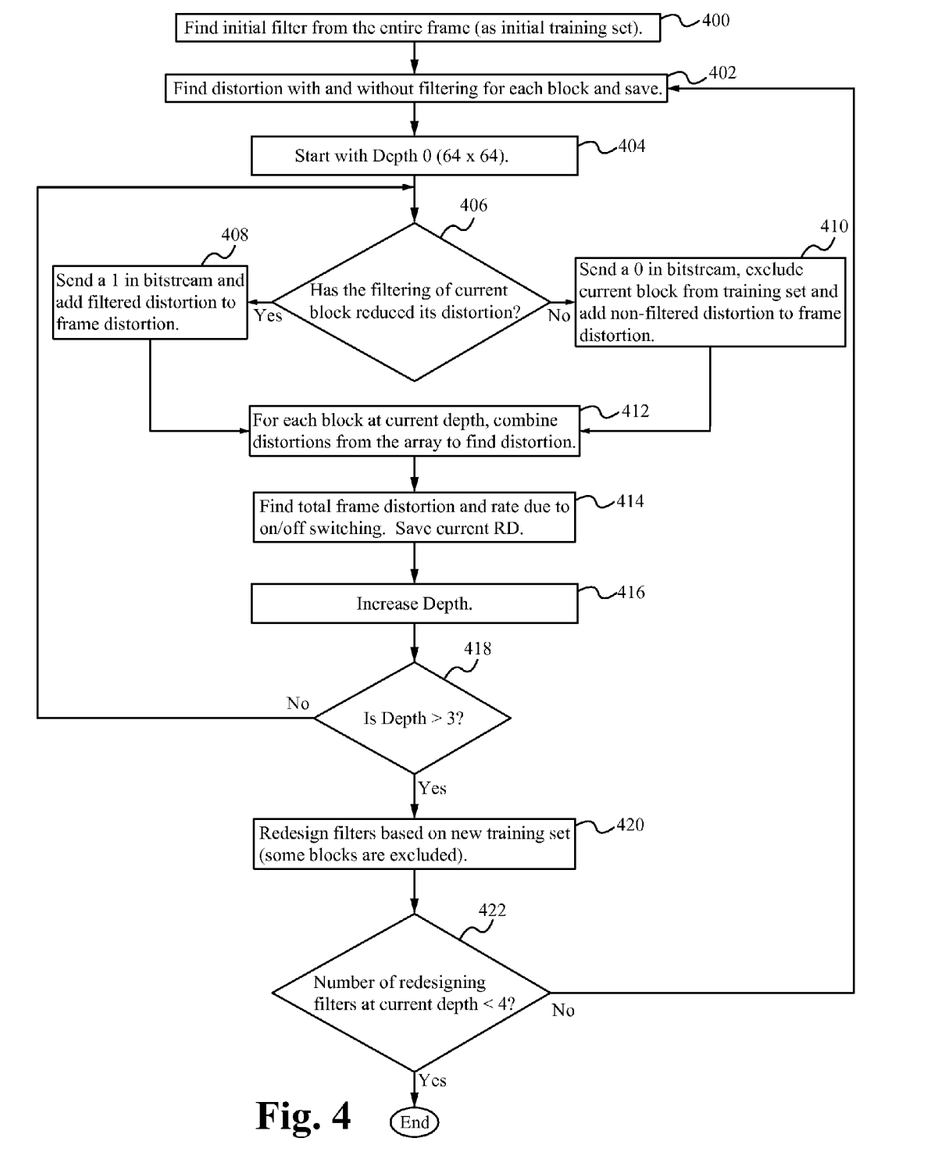
FIG. 4 illustrates a flowchart of a method of encoder optimization according to some embodiments.

FIG. 4 illustrates a flowchart of a method of encoder optimization according to some embodiments. In the step 400, an initial filter is found from an entire frame, as the initial training set. In the step 402, distortion with and without filtering for each block is found and saved. In the step 404, depth 0 (64×64 blocks) is used. In the step 406, it is determined if the filtering of the current block reduces distortion in the block. If the filtering has reduced the distortion, then in the step 408, a "1" is sent in the bitstream, and the filtered distortion is added to the frame distortion. If the filtering has not reduced the distortion, then in the step 410, a "0" is sent in the bitstream, the current block is excluded from the training set and the non-filtered distortion is added to the frame distortion. In the step 412, for each block at the current depth, distortions are combined from the array to find distortion. In the step 414, the total frame distortion and rate due to on/off switching is found, and the current rate distortion is saved. In the step 416, the depth is increased. In the step 418, it is determined if the depth is greater than 3. If the depth is not greater than 3, then the process returns to before the step 406. If the depth is greater than 3, then in the step 420, filters are redesigned based on the new training set. In the step 422, if the number of redesigning filters at the current depth is less than 2, then the process returns to the step 402. In the step 422, if the number of redesigning filters at the current depth is greater than or equal to 2, then the process ends. In some embodiments, fewer or more steps are implemented, and in some embodiments, the order of the steps is modified.

Figure 5:
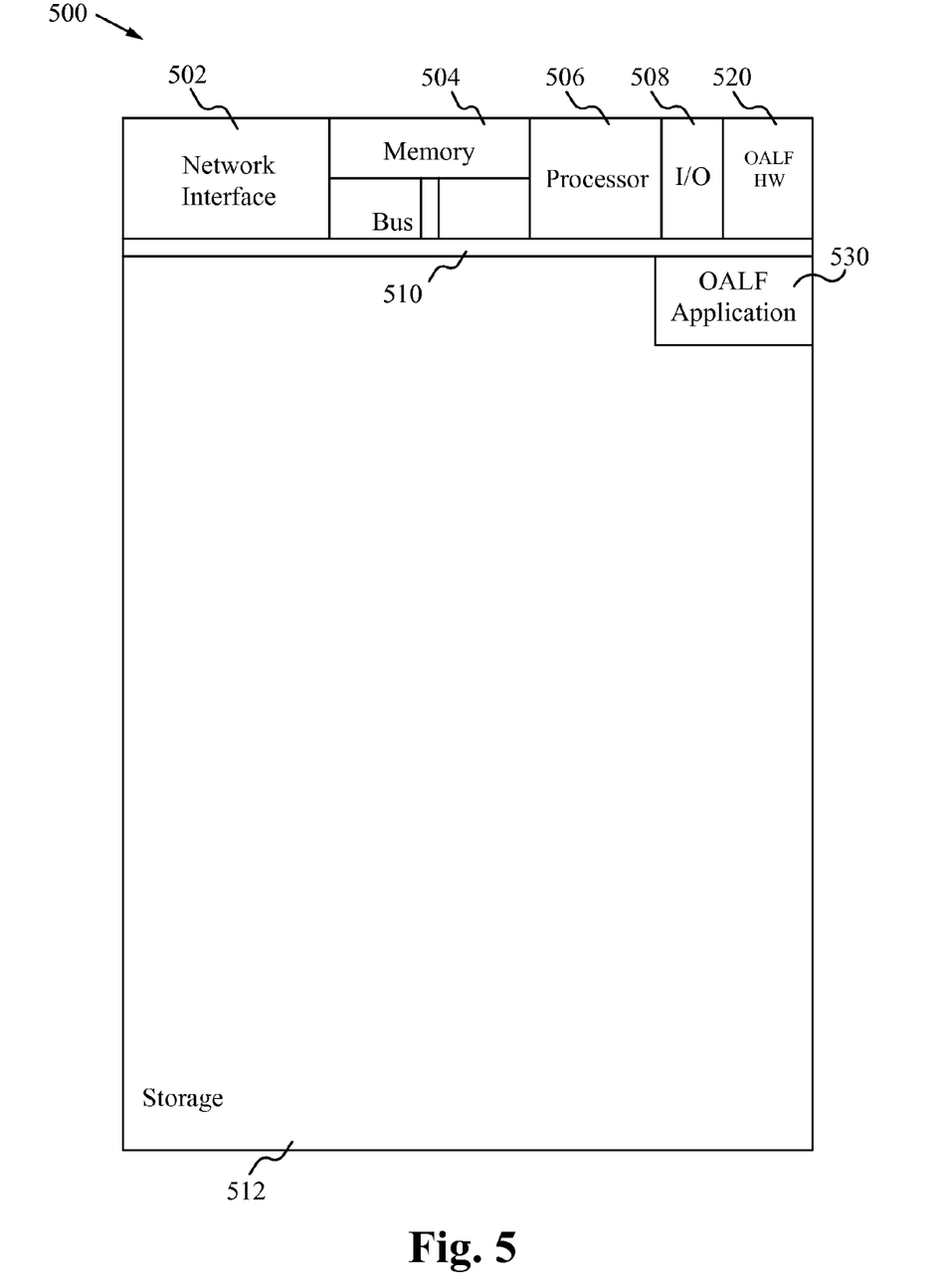
FIG. 5 illustrates a block diagram of an exemplary computing device configured to implement a optimized adaptive loop filter according to some embodiments.

FIG. 5 illustrates a block diagram of an exemplary computing device 500 configured to implement the optimized adaptive loop filter according to some embodiments. The computing device 500 is able to be used to acquire, store, compute, process, communicate and/or display information such as images, videos and audio. For example, a computing device 500 is able to be trained and then used to acquire and store an image. The optimized adaptive loop filter is typically used before or while acquiring images. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, Blu-Ray®, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, display, printer, modem, touchscreen, button interface and other devices. In some embodiments, the hardware structure includes multiple processors and other hardware to perform parallel processing. Optimized adaptive loop filter application(s) 530 used to perform the filtering are likely to be stored in the storage device 512 and memory 504 and processed as applications are typically processed. More or less components shown in FIG. 5 are able to be included in the computing device 500. In some embodiments, optimized adaptive loop filter hardware 520 is included. Although the computing device 500 in FIG. 5 includes applications 530 and hardware 520 for implementing the optimized adaptive loop filter, the filtering method is able to be implemented on a computing device in hardware, firmware, software or any combination thereof. For example, in some embodiments, the optimized adaptive loop filter applications 530 are programmed in a memory and executed using a processor. In another example, in some embodiments, the optimized adaptive loop filter hardware 520 is programmed hardware logic including gates specifically designed to implement the method.

In some embodiments, the optimized adaptive loop filter application(s) 530 include several applications and/or modules. In some embodiments, modules include one or more sub-modules as well.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system or any other suitable computing device.

To utilize an optimized adaptive loop filter, a device such as a digital camera is trained, and then the digital camera is able to be used to acquire a video/image. The optimized adaptive loop filter is automatically used for filtering the image, so that noise in the image is removed. The optimized adaptive loop filter is able to be implemented automatically without user involvement.

In operation, the optimized adaptive loop filter does not redesign filters inside the optimization loop of signaling depth which saves computations. Additionally, the Sum of Squared Errors (SSE) (distortion) of blocks is computed for the smallest blocks, thus, allowing for the distortion of larger blocks to be computed efficiently by adding block SSEs together which saves computations by removing redundant operations to calculate SSE of a block each time.

Some Embodiments of Encoder Optimization of Adaptive Loop Filters in HEVC

1. A method of implementing an optimized adaptive loop filter in a device comprising:
   a. determining distortion with and without filtering for each block of an image; and
   b. determining if filtering of a current block reduces distortion in the block;
   c. if the filtering reduces the distortion, adding the filtered distortion to frame distortion;
   d. if the filtering does not reduce the distortion, excluding the current block from a training set and adding non-filtered distortion to the frame distortion;
   e. for each block at a current depth, combining distortions to find the distortion;
   f. determining total frame distortion and rate due to on/off switching and saving a new training data set; and
   g. redesigning filters based on the new training data set.
2. The method of clause 1 further comprising determining an initial filter from an entire frame.
3. The method of clause 1 wherein the distortion is saved in an array.
4. The method of clause 1 wherein the new training set excludes one or more blocks.
5. The method of clause 1 wherein b-f occur while a number of redesigning filters at the current depth is less than 2.
6. The method of clause 1 further comprising saving a current rate distortion.
7. The method of clause 1 wherein c-f occur while the depth is less than or equal to 3, starting with depth 0 and increasing with each iteration.
8. The method of clause 1 wherein the method is implemented in hardware logic gates.
9. The method of clause 1 wherein the method is stored in a memory and processed by a processor.
10. The method of clause 1 wherein the method is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
11. A method of implementing an optimized adaptive loop filter in a device comprising:
   a. determining distortion with and without filtering for each block of an image; and
   b. while a number of redesigning filters at a current depth is less than 2:
      i. determining if filtering of a current block reduces distortion in the block;
      ii. while at a depth less than or equal to 3, starting with depth 0 and increasing with each iteration:
         (1) if the filtering reduces the distortion, adding the filtered distortion to frame distortion;
         (2) if the filtering does not reduce the distortion, excluding the current block from a training set and adding non-filtered distortion to the frame distortion;
         (3) for each block at the current depth, combining distortions to find the distortion;
         (4) determining total frame distortion and rate due to on/off switching; and
         (5) saving current rate distortion as a new training data set; and
      iii. redesigning filters based on the new training data set.
12. The method of clause 11 further comprising determining an initial filter from an entire frame.
13. The method of clause 11 wherein the distortion is saved in an array.
14. The method of clause 11 wherein the new training set excludes one or more blocks.
15. The method of clause 11 wherein if the filtering reduces the distortion, a 1 is sent in the bitstream, and if the filtering does not reduce the distortion, a 0 is sent in the bitstream.
16. The method of clause 11 wherein the method is implemented in hardware logic gates.
17. The method of clause 11 wherein the method is stored in a memory and processed by a processor.
18. The method of clause 11 wherein the method is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
19. An apparatus comprising:
   a. a memory for storing an application, the application for:
      i. determining distortion with and without filtering for each block of an image; and
      ii. while a number of redesigning filters at a current depth is less than 2:

(1) determining if filtering of a current block reduces distortion in the block;
(2) while at a depth less than or equal to 3, starting with depth 0 and increasing with each iteration:
(a) if the filtering reduces the distortion, adding the filtered distortion to frame distortion;
(b) if the filtering does not reduce the distortion, excluding the current block from a training set and adding non-filtered distortion to the frame distortion;
(c) for each block at the current depth, combining distortions to find the distortion;
(d) determining total frame distortion and rate due to on/off switching; and
(e) saving current rate distortion as a new training data set; and
(3) redesigning filters based on the new training data set; and
b. a processing component coupled to the memory, the processing component configured for processing the application.
20. The apparatus of clause 19 further comprising determining an initial filter from an entire frame.
21. The apparatus of clause 19 wherein the distortion is saved in an array.
22. The apparatus of clause 19 wherein the new training set excludes one or more blocks.
23. The apparatus of clause 19 wherein if the filtering reduces the distortion, a 1 is sent in the bitstream, and if the filtering does not reduce the distortion, a 0 is sent in the bitstream.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of implementing an optimized adaptive loop filter in a device comprising:
a. determining distortion with and without filtering for each block of an image; and
b. determining if filtering of a current block reduces distortion in the block;
c. if the filtering reduces the distortion, adding the filtered distortion to frame distortion;
d. if the filtering does not reduce the distortion, excluding the current block from a training set and adding non-filtered distortion to the frame distortion;
e. for each block at a current depth, combining distortions to find the distortion;
f. determining total frame distortion and rate due to on/off switching and saving a new training data set; and
g. redesigning filters based on the new training data set.

2. The method of claim 1 further comprising determining an initial filter from an entire frame.
3. The method of claim 1 wherein the distortion is saved in an array.
4. The method of claim 1 wherein the new training set excludes one or more blocks.
5. The method of claim 1 wherein b-f occur while a number of redesigning filters at the current depth is less than 2.
6. The method of claim 1 further comprising saving a current rate distortion.
7. The method of claim 1 wherein c-f occur while the depth is less than or equal to 3, starting with depth 0 and increasing with each iteration.
8. The method of claim 1 wherein the method is implemented in hardware logic gates.
9. The method of claim 1 wherein the method is stored in a memory and processed by a processor.
10. The method of claim 1 wherein the method is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
11. A method of implementing an optimized adaptive loop filter in a device comprising:
a. determining distortion with and without filtering for each block of an image; and
b. while a number of redesigning filters at a current depth is less than 2:
i. determining if filtering of a current block reduces distortion in the block;
ii. while at a depth less than or equal to 3, starting with depth 0 and increasing with each iteration:
(1) if the filtering reduces the distortion, adding the filtered distortion to frame distortion;
(2) if the filtering does not reduce the distortion, excluding the current block from a training set and adding non-filtered distortion to the frame distortion;
(3) for each block at the current depth, combining distortions to find the distortion;
(4) determining total frame distortion and rate due to on/off switching; and
(5) saving current rate distortion as a new training data set; and
iii. redesigning filters based on the new training data set.
12. The method of claim 11 further comprising determining an initial filter from an entire frame.
13. The method of claim 11 wherein the distortion is saved in an array.
14. The method of claim 11 wherein the new training set excludes one or more blocks.
15. The method of claim 11 wherein if the filtering reduces the distortion, a 1 is sent in the bitstream, and if the filtering does not reduce the distortion, a 0 is sent in the bitstream.
16. The method of claim 11 wherein the method is implemented in hardware logic gates.
17. The method of claim 11 wherein the method is stored in a memory and processed by a processor.
18. The method of claim 11 wherein the method is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
19. An apparatus comprising:
a. a memory for storing an application, the application for:
i. determining distortion with and without filtering for each block of an image; and
ii. while a number of redesigning filters at a current depth is less than 2:

(1) determining if filtering of a current block reduces distortion in the block;
(2) while at a depth less than or equal to 3, starting with depth 0 and increasing with each iteration:
   (a) if the filtering reduces the distortion, adding the filtered distortion to frame distortion;
   (b) if the filtering does not reduce the distortion, excluding the current block from a training set and adding non-filtered distortion to the frame distortion;
   (c) for each block at the current depth, combining distortions to find the distortion;
   (d) determining total frame distortion and rate due to on/off switching; and
   (e) saving current rate distortion as a new training data set; and
(3) redesigning filters based on the new training data set; and b. a processing component coupled to the memory, the processing component configured for processing the application.

20. The apparatus of claim 19 further comprising determining an initial filter from an entire frame.

21. The apparatus of claim 19 wherein the distortion is saved in an array.

22. The apparatus of claim 19 wherein the new training set excludes one or more blocks.

23. The apparatus of claim 19 wherein if the filtering reduces the distortion, a 1 is sent in the bitstream, and if the filtering does not reduce the distortion, a 0 is sent in the bitstream.

\* \* \* \* \*